Aug. 16, 1932.     H. C. WALTERS     1,871,931
SHOCK ABSORBER
Filed Nov. 23, 1928     2 Sheets-Sheet 1

Inventor
Herbert C. Walters
By Spencer, Hardman and Feiw
Attorneys

Aug. 16, 1932.     H. C. WALTERS     1,871,931
SHOCK ABSORBER
Filed Nov. 23, 1928     2 Sheets-Sheet 2

Inventor
Herbert C. Walters
By Spencer, Hardman and Feder
Attorneys

Patented Aug. 16, 1932

1,871,931

UNITED STATES PATENT OFFICE

HERBERT C. WALTERS, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed November 23, 1928. Serial No. 321,479.

This invention relates to improvements in shock absorbers particularly adapted to cushion the movement of two relatively movable members, for example, the frame and axle of a vehicle.

It is among the objects of the present invention to provide a shock absorber which is automatically adjustable, properly to resist both the approaching and separating movements of the frame and axle of a vehicle, whereby road shocks are dissipated.

Further objects and advantages of the present invention will be apparent from the following description, reference being had to the accompanying drawings, wherein a preferred embodiment of one form of the present invention is clearly shown.

Figure 1:
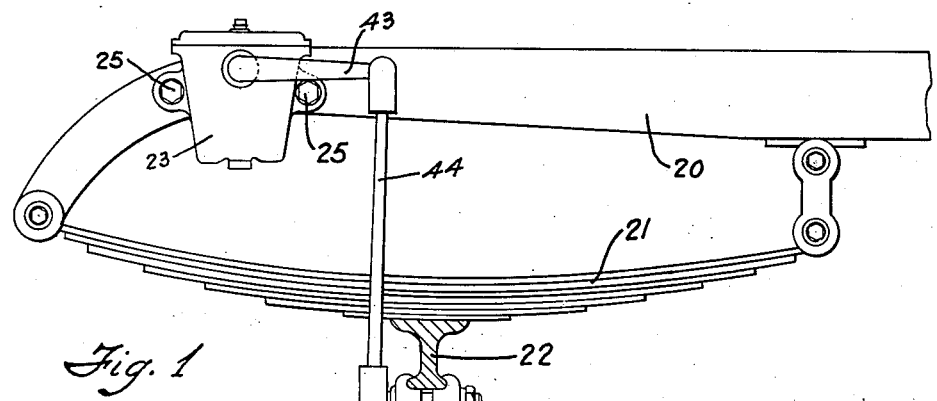
Fig. 1 illustrates a front portion of the frame of an automotive vehicle, supported by springs upon the usual axle, the shock absorber embodying the present invention being shown applied thereto.

Referring to the drawings, the numeral 20 designates one of the frame members of the vehicle which is supported by the spring 21 upon the axle 22.

The shock absorber comprises a casing 23 having apertured ears 24 for receiving bolts 25 by which the shock absorber is attached to the frame 20. Casing 23 presents a fluid chamber 26 and two cylinders 27 and 28, a partition 29, within the casing, cooperating with the walls of the casing to form said cylinders. A cap 30, fitted with a gasket 31, is secured to the casing 23 by screws 32, providing a leak proof cover for said casing.

Oppositely disposed lug portions 33 and 34 on the shock absorber casing 23 provide aligned bearings 35 and 36 respectively, in which is journalled the rocker shaft 37. The open end of bearing 36 is sealed by a gasket and disc 38 which fit tightly into a counterbored recess in the lug portion 34. Fluid is substantially prevented from leaking through the bearing portion 35 by a packing comprising packing members 39 forced into sealing engagement with shaft 37 by the packing gland 40. This gland fits snugly into the counterbore 42 in the lug portion 33.

The rocker-shaft 34 has one end extending outside the casing to which is secured the shock absorber operating arm 43, the free end of which is swivelly connected to one end of the connecting rod 44. The other end of said connecting rod is swivelly connected with a bracket 45 which in turn is anchored to the axle 22. Within the fluid chamber 26 a rocker-lever 46 is supported by the shaft 37, knurled portions being provided on both the shaft and the rocker-lever so as to prevent relative rotating motion between these two members. A set screw 47 in the rocker-lever 46 extends into an annular groove 48 in the rocker-shaft, to prevent relative endwise motion between the shaft and the rocker-lever. The rocker-lever has oppositely disposed arms 49 and 50, the free end of the former aligning substantially with the axis of cylinder 27, the free end of the latter aligning substantially with the axis of the cylinder 28. On each side of the rocker-lever 46 and supported by the shaft 37 so as to be rotatable therewith, is a cam member, these cams being designated by the numerals 51 and 52.

Within cylinder 27 there is provided a reciprocable piston 57. A similar piston 58 is provided within the cylinder 28. Inasmuch as both pistons 57 and 58 are constructed alike, the piston 57 will be described detailedly.

Figure 2:
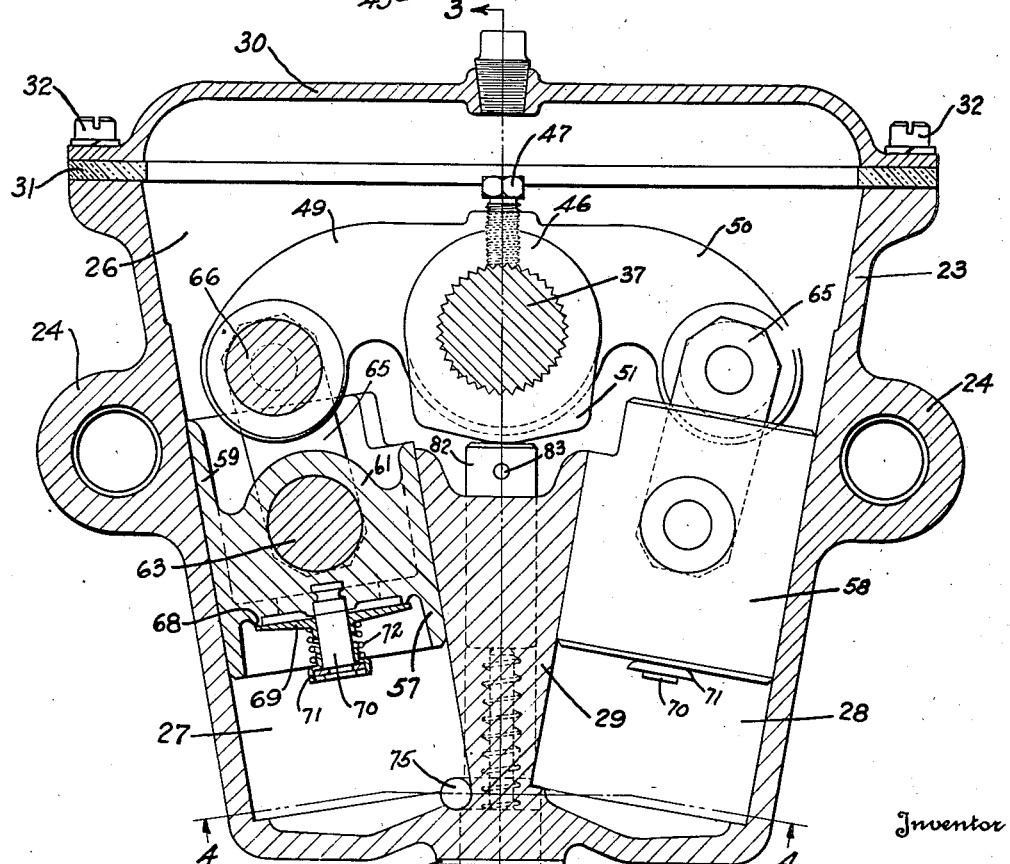
Fig. 2 is a cross sectional view taken longitudinally through the shock absorber, certain parts being shown in elevation for the sake of clearness.
Figures 3, 5, 6:
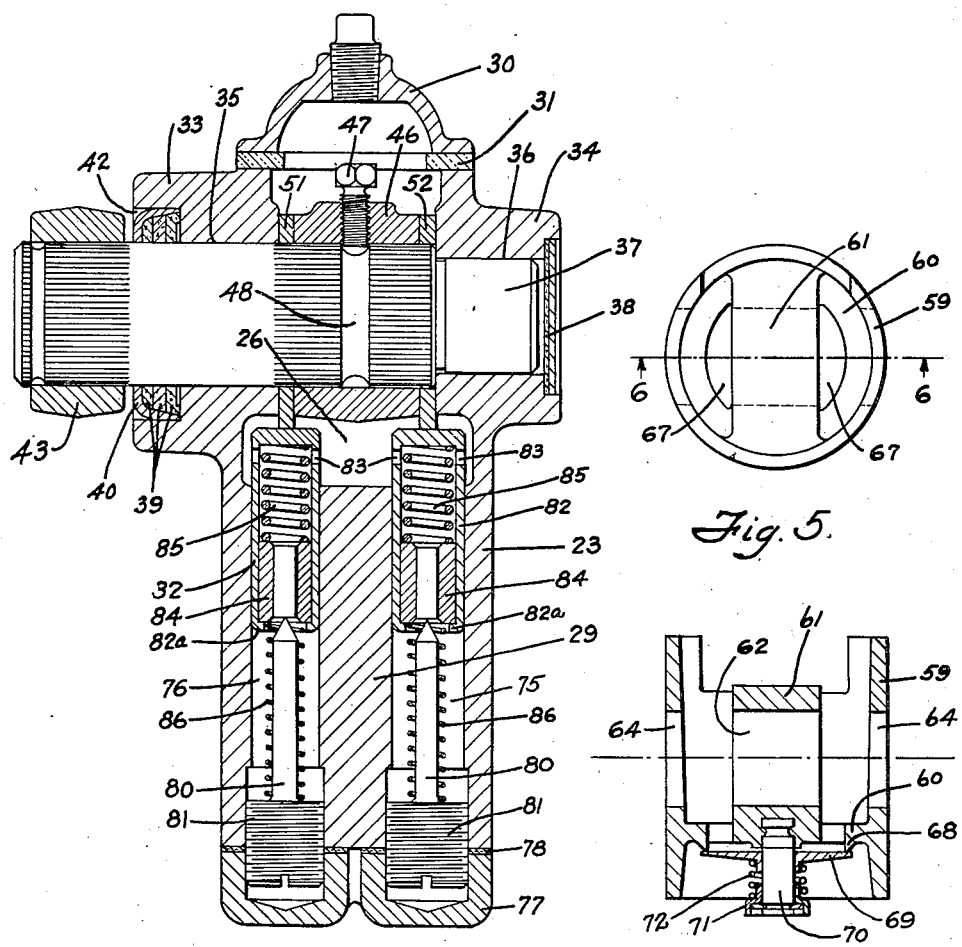
Fig. 3 is a transverse sectional view taken along the line 3—3 of Fig. 2.
Fig. 5 is a detail plan view of one of the pistons of the shock absorber.
Fig. 6 is a cross sectional view taken along the line 6—6 of Fig. 5.

As shown in the Figs. 2, 5 and 6, the piston comprises a cylindrical skirt portion 59 having a transverse web portion 60, spaced somewhat from the one end of the cylindrical skirt portion 59 as shown in the Fig. 6. A transverse lug 61 is provided centrally of the piston and has a passage 62 for receiving the wrist pin 63 of the piston. In order to permit insertion of the wrist pin into the passage 62, the skirt portion 59 of the piston is provided with diametrically opposite openings 64. The wrist pin 63 extends from each side of the lug, each end of the wrist pin having a link 65 secured thereto, the other end of said links being connected to the respective ends of a pivot pin 66 journaled within the free end of the rocker arm 49. Thus the rocker arm 49 is operatively connected with the piston 57 and any motion of said arm will be transmitted to said piston. On each side of the transverse lug member 61 the web portion 60 is provided with an opening 67. On the one side of the web portion 60 and encompassing the opening 67 there is provided an annular ridge 68 providing a seat for the valve 69. A valve pin 70 is mounted in the lug portion 61 so as to be substantially coaxial of the annular ridge 68, said valve stem 70 slidably supporting the valve 69 which is yieldably urged into engagement with the valve-seat 68 by a spring 72, one end of which is supported on the abutment collar 71 attached to the outer end of the valve pin 70. This valve structure comprises the means for establishing a free flow of fluid from the fluid chamber into the cylinder in response to the movement of the piston 57 in one direction. Piston 58 is provided with a valve structure as described in connection with piston 57, said piston 58 being likewise operatively connected with the rocker arm 50.

The adjustable means for controlling the flow of fluid from the cylinders and the means for adjusting said adjustable means throughout the entire range of movement of the piston operating means will now be described.

Figure 4:
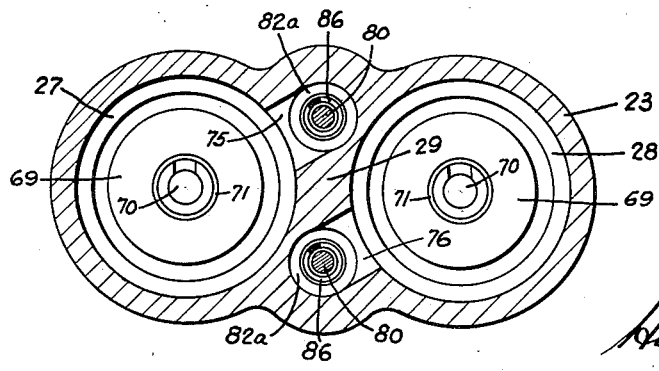
Fig. 4 is a detail sectional view taken along the line 4—4 of Fig. 2.

The partition 29 of the casing, separating the two cylindrical portions 27 and 28, is provided with two, substantially parallel passages or auxiliary cylinders 75 and 76, the upper ends thereof opening into the fluid chamber 26, the opposite ends being closed by the end cover member 77 attached to the casing in any suitable manner and provided with gaskets 78 substantially to reduce leaks at this point. As shown in Fig. 4, passage 75 communicates with the cylinder 27, and passage 76 communicates with cylinder 28. In each passage there is provided a metering pin 80 having an enlarged screw-threaded head 81 which screw-threadedly engages the lower end of a respective passage, rigidly to support the metering pin substantially coaxial in its respective passage. The screw-threaded head portions 81 may be rotated in either direction for purposes of adjustment. Each passage 75 and 76 has a recessed plunger 82 slidably supported therein, the upper or closed ends of the plungers extending normally above the end of the partition 29. Each plunger has transverse passages 83 adjacent its closed end which provide communication between the fluid chamber 26 and the interior of the respective plunger. The lower ends of said plungers 82 are turned inwardly, providing an inwardly extending, annular flange 82a in each plunger, each of which supports a tubular valve-member 84 slidably supported within the respective plunger. A spring 85 yieldably urges its respective tubular member 84 into engagement with the inwardly extending annular flange 82a. The outer or lower ends of the tubular members 84 each present an orifice adapted to cooperate with the respective tapered ends of the metering pins 80 to control the fluid flow through the passages 75 and 76. A spring 86 supported about each metering pin, has one end resting upon the screw-threaded head 81 of its respective metering pin, the other end engaging the end of the respective tubular member 84. These springs yieldably urge the respective recessed plungers 82 upwardly so that the upper surfaces or head portions engage with the respective cams 51 and 52 which adjust these fluid flow control devices to their proper positions in accordance with the positions of the pistons in their respective cylinders 28 and 27. Rotation of the screw-threaded heads 81 of the respective metering pins will vary the normal relative position of the tapered end of the metering pins and their cooperating tubular members 84.

When the spring 21 is flexed toward the frame 20, due to the road wheels of the vehicle striking an obstruction in the roadway over which the vehicle is being operated, the connection comprising the bracket 45, connecting rod 44 and the shock absorber operating arm 43 will rotate the rocker-shaft 37 in a counter-clockwise direction, thus rocker arm 46 and its component arms 49 and 50 will likewise be operated in a counter-clockwise direction. Arm 50 in this instance will move the piston 58 out of its cylinder 28, or, in a direction away from the bottom of said cylinder, thus the fluid within the fluid chamber 26 will move the valve 69 of this piston from its valve-seat 68 to establish a substantially free flow of fluid from the fluid chamber through the openings 67 past valve 69 into the cylinder 28. Arm 49, at the same time, is moving the piston 57 downwardly into its cylinder 27, or, toward the closed end thereof, its valve 69, in this instance, being more tightly pressed upon its seat to prevent fluid from passing through the piston. This movement of the piston thus exerts pressure upon the fluid within the cylinder 27, causing said fluid to flow through the passage 75, through the orifice presented between the metering pin 80 and the tubular member 84, located in this passage, the fluid then flowing through said tubular member 84, the recessed plunger 82 and its transverse passages 83, into the fluid chamber 26. The fluid flow through passage 75 is controlled in accordance with the movement of the piston operating member inasmuch as the cam 52 will, while the arm 49 is moving in a counter-clockwise direction, also be moved counter-clockwise, the contour of the cam being such that it will gradually move the recessed plunger 82 toward the metering pin 80, thus the orifice between the tubular member 84 and the tapered end of the metering pin is gradually reduced as the piston 57 moves toward the bottom of the cylinder 27 so that the fluid flow from said cylinder in response to the movement of its piston 57 downwardly, is increasingly restricted.

As soon as the spring 21 has reached the limit of its flexure caused by this particular bump, it will have a tendency to return to its normal, unflexed position, suddenly, and with a rebounding movement, such rebound resulting in jars and jolts being transmitted to the frame of the vehicle. In the flexed position of spring 21, the rocker lever 46 will have its arm 49 in a lowered position, that is, in a position in which the piston 57 is substantially adjacent the closed end of its cylinder, while the rocker arm portion 50 will be located in its upper position, or, in a position in which its piston 58 is located adjacent the open end of its cylinder. The contours of cams 51 and 52 are such that when the rocker lever 46 is in the extreme rocked position, that is, in either the extreme counter-clockwise or the extreme clockwise position, the cams are maintaining the respective recessed plungers 82 depressed, or more specifically, in a position in which the orifices presented between the respective tubular members 84 and pins 80 are restricted to their greatest degree. As the spring 21 begins to move from its flexed position, moving the rocker lever 46 clockwise, which movement lifts the piston 57 to establish a free flow of fluid into its cylinder 27, the piston 58 will be moved into its cylinder 28 to establish a flow of fluid out of cylinder 28 through the passage 76. This flow of fluid through said passage 76 will at first be comparatively highly restricted, however, as the movement of the piston 58 continues in a clockwise direction and the cam 51 is moved likewise, the orifice provided between the tubular member 84 and the metering pin 80, within the passage 76, will be gradually enlarged, thus the restriction to the flow of fluid from the cylinder 28 through said passage 76 will gradually be decreased until the device has been moved substantially into the intermediate, normal position, in which position the device is illustrated in the Fig. 2. Continued movement of the arm 46 clockwise, due to the tendency of the spring 21 to move past its normal position, will continue to move the piston 58 downwardly into its cylinder 28, the cam 51 now moving the recessed plunger 82 into passage 76 so as to reduce the fluid flow orifice in said passage 76, and thus, as the piston 58 continues to move past its intermediate normal position, the fluid flow from said cylinder 28 is increasingly restricted. From this it may be seen that the movement of the spring 21 from its flexed position substantially to its normal position is decreasingly resisted, continued movement of the spring past its normal position, however, being increasingly resisted.

If for any reason excessive pressures are built up within either one of the cylinders 27 or 28, the tubular member 84 in the respective passages 75 and 76 of the said cylinders will be moved against the effect of their respective springs 85 so as to increase automatically the orifices in the respective passages whereby the excessive fluid pressure therein is relieved.

From the aforegoing it may be seen that applicant has provided a device of simple structure and design, automatically adjustable so as properly to resist both the approaching and separating movements of the frame and axle of a vehicle, whereby road shocks or rebound jolts are substantially dissipated. The device is adjustable to meet the requirements of the different vehicles upon which it may be attached, such adjustment being made by the rotation of the metering pin heads 81 to increase or decrease the fluid flow orifices in the respective passages 75 and 76. The cams 51 and 52 may be replaced with cams of other shapes so as to vary the operation of the respective recessed plungers 82 and thus vary the resistance offered by the shock absorber.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing presenting a cylinder; a piston in said cylinder; operating means for said piston; means adapted to control the flow of fluid from said cylinder, said means comprising an adjustably supported tubular member and a metering pin; and means under the control of the operating means for positively adjusting said adjustable member throughout the entire range of movement of the operating means.

2. A shock absorber comprising, in combination, a casing presenting a cylinder; a piston in said chamber; operating means for said piston; a mechanically adjustable fluid flow controlling means comprising a spring loaded tube movably carried in an adjustable member, and a stationary metering pin cooperating with the tube, adapted to control the flow of fluid from the cylinder in response to the movement of the piston in the one direction; and means provided by the operating means, engaging the fluid flow controlling means positively to adjust said controlling means throughout the entire range of movement of said operating means.

3. A shock absorber comprising, in combination, a casing presenting a cylinder; a piston in said cylinder; operating means for said piston; a valve, normally presenting an orifice and mechanically adjustable variably to control the flow of fluid from the cylinder; means provided by the operating means for properly adjusting said valve in accordance with the position and the direction of movement of said operating means, said valve being adjustable in response to fluid pressures to vary the orifice in accordance to pressure increases of a predetermined degree.

4. A shock absorber comprising, in combination, a casing presenting a cylinder; a piston in said cylinder; operating means for said piston; means for establishing a substantially free flow of fluid into the cylinder in response to the movement of the piston in one direction; mechanically adjustable fluid flow controlling means for establishing a restricted flow of fluid from said cylinder in accordance with the movement of said piston in the other direction; and means under control of the piston operating means directly engaging said mechanically adjustable means and adapted positively to adjust the fluid flow controlling means throughout the entire movement of the operating means.

5. A shock absorber having, in combination, a casing comprising two cylinders and a fluid chamber, pistons in said cylinders; an operating member for reciprocating said pistons; fluid flow controlling means provided between each cylinder and the fluid chamber, said means comprising a stationary metering pin and an adjustable tubular member, and separate means provided by the operating member for positively adjusting the position of the tubular member relative to the metering pin in accordance with the movement of their respective pistons by the operating member.

6. A shock absorber comprising, in combination, a casing having a main cylinder; an auxiliary cylinder in communication with the main cylinder; a fluid chamber; a piston in the main cylinder; an operating member for said piston; a metering pin; an adjustable fluid flow controlling tube in the auxiliary cylinder adapted to cooperate with the metering pin to control the flow of fluid from the main cylinder, through the auxiliary cylinder, into the fluid chamber, in response to the movement of the piston in the one direction; and means provided by the piston operating member for properly adjusting the fluid flow controlling tube relative to the metering pin in accordance with the movement of the piston in said one direction.

7. A shock absorber comprising, in combination, a casing having a main cylinder; an auxiliary cylinder in communication with the main cylinder; a fluid chamber; a piston in the main cylinder; an operating member for said piston; a metering pin supported within the auxiliary cylinder; a tubular plunger slidably supported within the auxiliary cylinder and presenting an orifice adapted to cooperate with the metering pin to control the passage of fluid from the main cylinder, through the auxiliary cylinder to the fluid chamber; means yieldably maintaining the plunger in properly spaced relation with the metering pin; and means provided by the piston operating member for varying the position of the tubular member, relative to the metering pin, in accordance with the movement of said member.

8. A shock absorber comprsing, in combination, a casing having a main cylinder; an auxiliary cylinder in communication with the main cylinder; a fluid chamber; a piston in the main cylinder; an operating member for said piston; a metering pin supported within the auxiliary cylinder; a tubular plunger slidably supported within the auxiliary cylinder and presenting an orifice adapted to cooperate with the metering pin to control the passage of fluid from the main cylinder, through the auxiliary cylinder to the fluid chamber; and means provided by the piston operating member for controlling the position of the plunger orifice relative to the metering pin in accordance with the movement of said piston operating member.

9. A shock absorber comprising, in combination, a casing having a cylinder and a fluid chamber; a piston in the cylinder; an operating member for reciprocating the piston; a duct in the casing adapted to conduct fluid from said cylinder to the fluid chamber in response to the movement of the piston in one direction; means within the duct for controlling said flow of fluid therethrough, said means comprising a stationary metering pin adapted to cooperate with the tube mechanically adjustable relative to the metering pin by the piston operating member and adjustable by fluid pressure within the cylinder and duct, exceeding a predetermined degree.

10. A shock absorber comprising, in combination, a casing having a cylinder and a fluid chamber; a piston in the cylinder; an operating member for reciprocating the piston; a duct in the casing adapted to conduct fluid from said cylinder to the fluid chamber in response to the movement of the piston in one direction; means within the duct for controlling said flow of fluid therethrough, said means comprising a stationary metering pin adapted to cooperate with a tubular member providing an orifice mechanically adjustable by the piston operating member increasingly to restrict the said flow of fluid through the tubular member, past the metering pin in accordance with the movement of the piston in said one direction, said tubular member being movable away from the metering pin by fluid pressure to decrease said restriction when the fluid pressure exceeds a predetermined degree.

11. A shock absorber comprising, in combination, a casing having a cylinder and a fluid chamber; a piston in the cylinder; an operating member for reciprocating the piston; a duct in the casing adapted to conduct fluid from said cylinder to the fluid chamber in response to the movement of the piston in one direction; fluid flow controlling means within the duct for controlling the passage of fluid therethrough, said means comprising a metering pin rigidly supported within the duct, a recessed plunger slidably supported in said duct and having transverse passages at its one end connecting the fluid chamber with the interior of the plunger, a tubular member yieldably maintained at one end of the plunger and presenting an orifice adapted to cooperate with the metering pin; means provided by the piston operating member for moving the plunger to adjust the position of its tubular member relative to the metering pin in accordance with the movement of the piston, said tubular member being operable by pressure exceeding a predetermined degree to move the tubular member from said metering pin.

12. A shock absorber comprising, in combination, a casing providing a cylinder and a fluid reservoir; a piston in said cylinder forming a compression chamber therein; means for operating said piston; a duct providing communication between the compression chamber and fluid reservoir; a metering pin in said duct; a tubular member slidably carried within said duct and adapted to cooperate with the metering pin to provide a variable flow orifice; a spring on the metering pin, supporting the tubular member; another spring carried upon the tubular member; and an actuator carried by the piston operating means and engaging the spring upon the tubular member to operate said member in accordance with the operation and position of the piston.

13. A shock absorber comprising, in combination, a casing providing a cylinder and a fluid reservoir; a piston in said cylinder forming a compression chamber therein; means for operating said piston; a duct providing communication between the compression chamber and fluid reservoir; a metering pin in said duct; a tubular member slidably carried within said duct and adapted to cooperate with the metering pin to provide a variable flow orifice; a spring on the metering pin, supporting the tubular member; a spring of greater tension than the spring on the metering pin, carried upon the tubular member; a cap on said spring; and an operating cam on the piston operating member, engaging the cap to move the tubular member through the spring thereon for adjusting the orifice in accordance with piston movement and position.

In testimony whereof I hereto affix my signature.

HERBERT C. WALTERS.